April 26, 1932.  J. F. GRACE  1,855,231
SURFACE CONDENSER
Filed Nov. 19, 1931   10 Sheets-Sheet 4

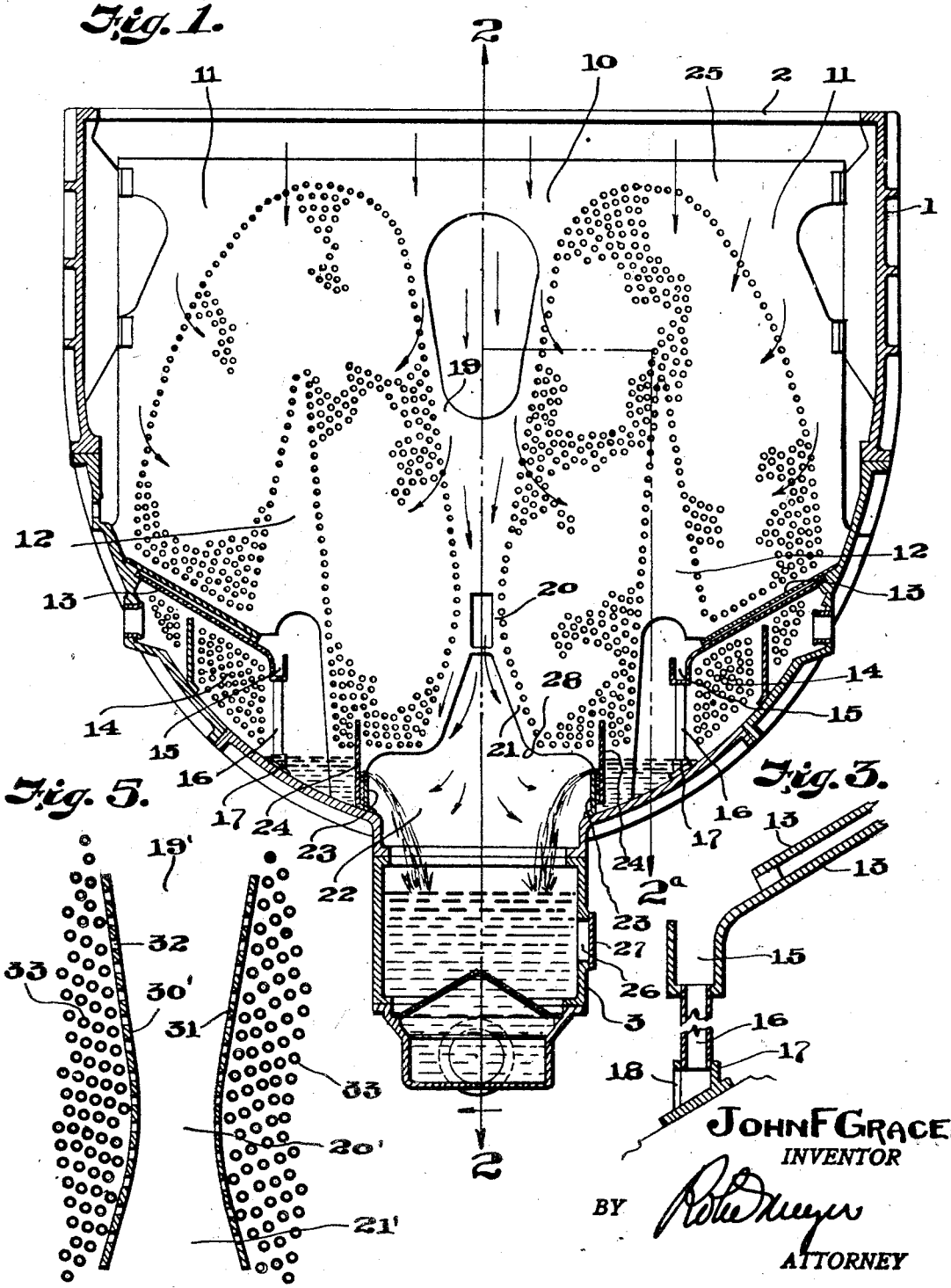

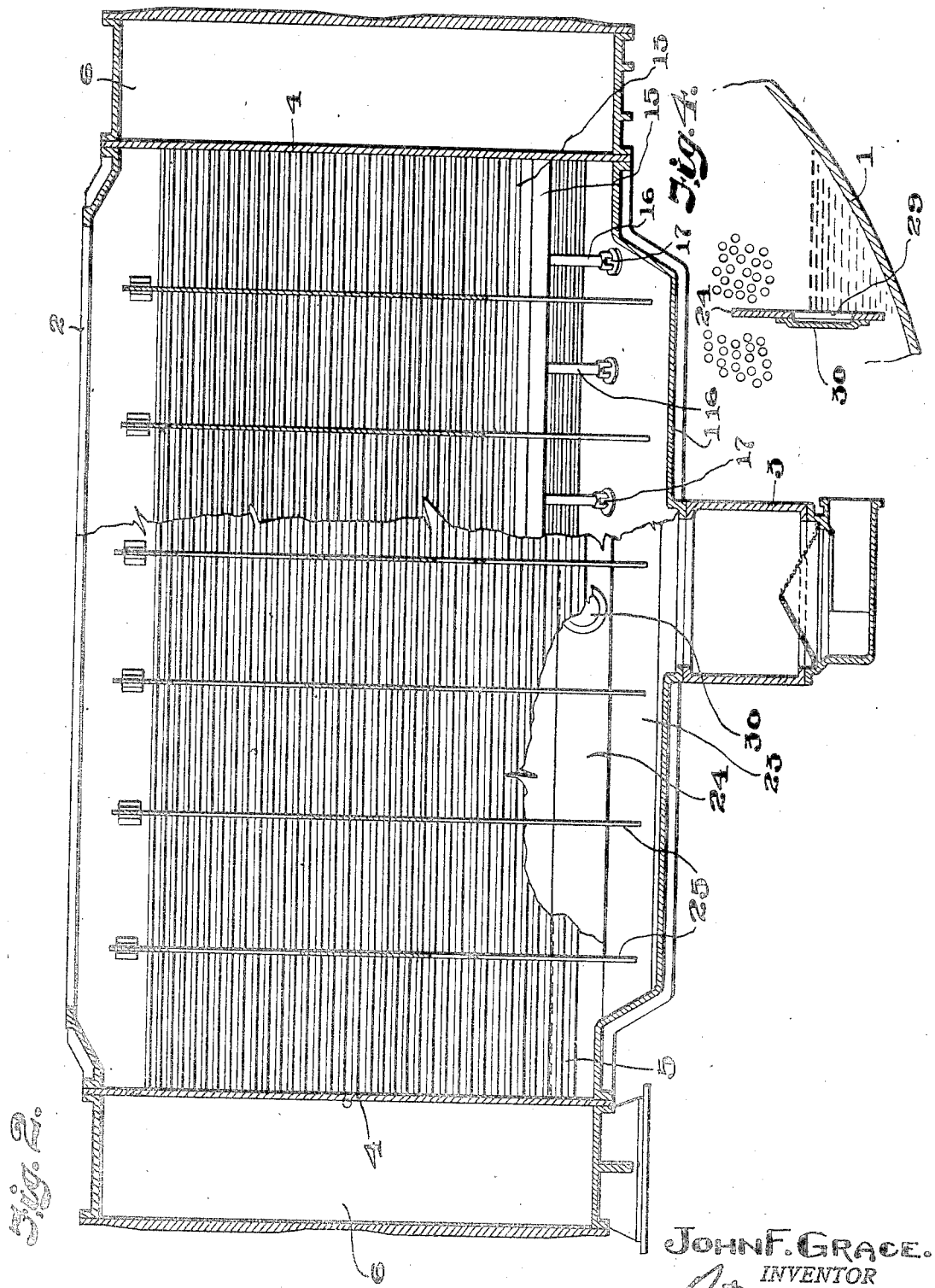

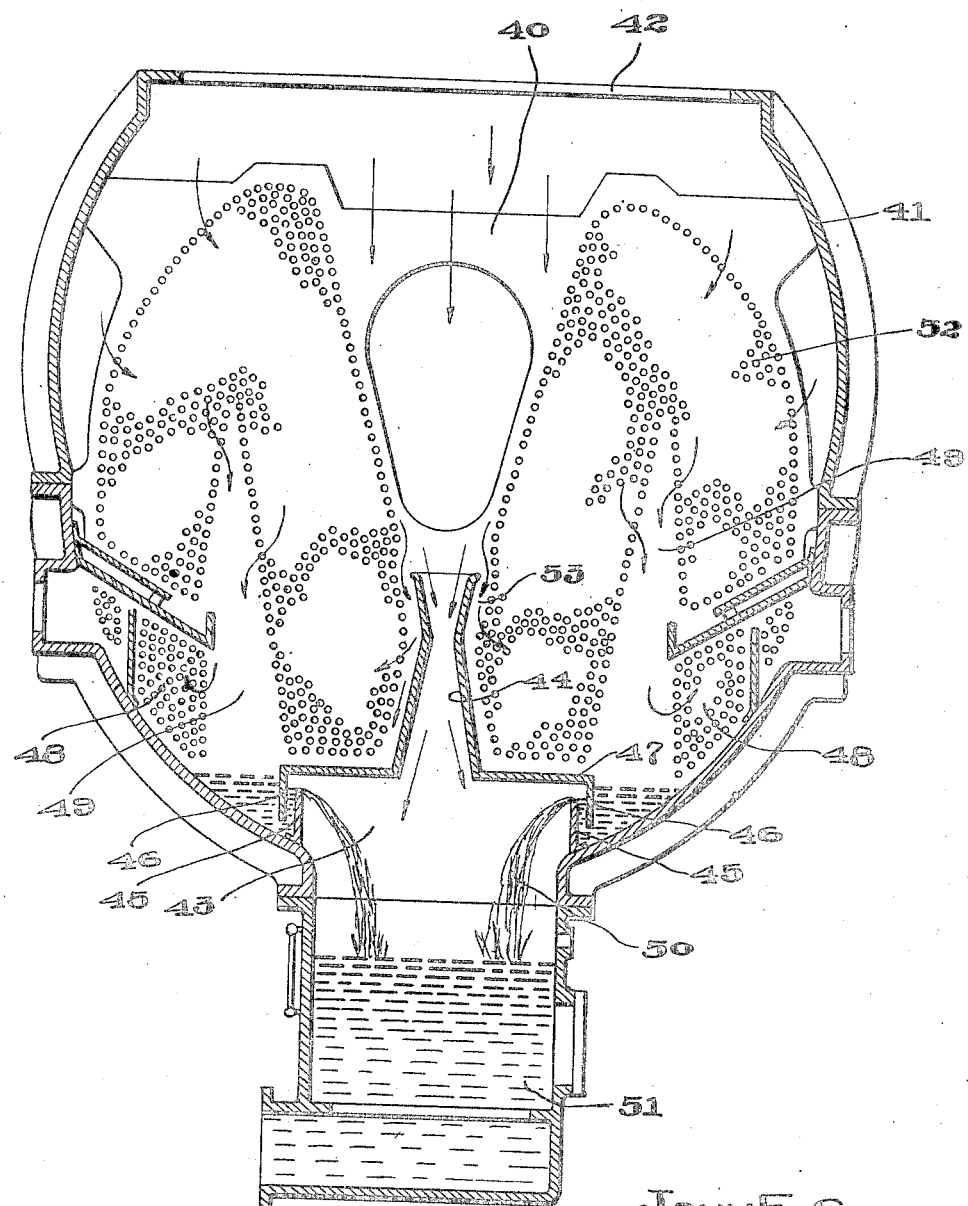

John F. Grace.
INVENTOR

BY Rob Meyer
ATTORNEY

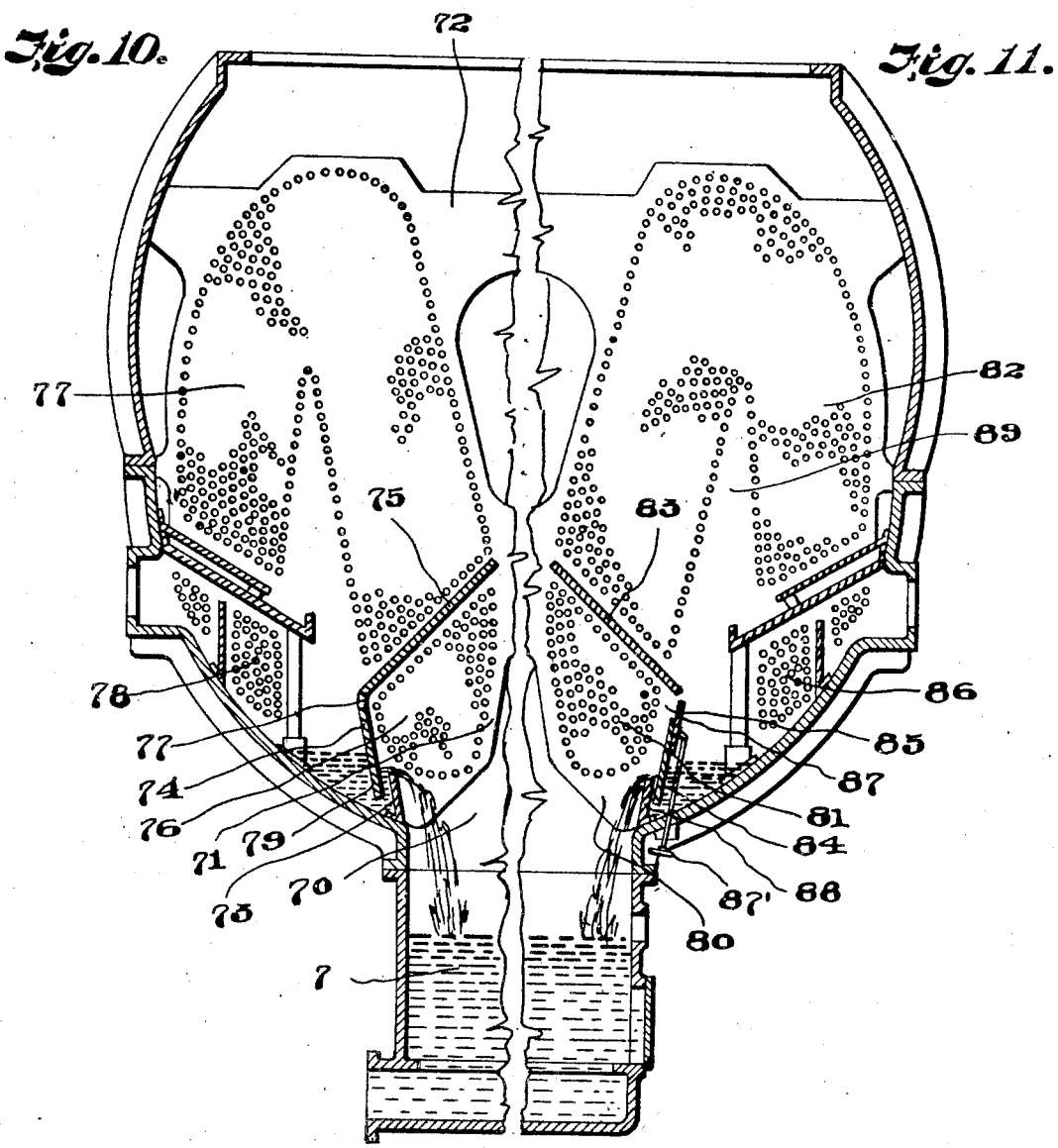

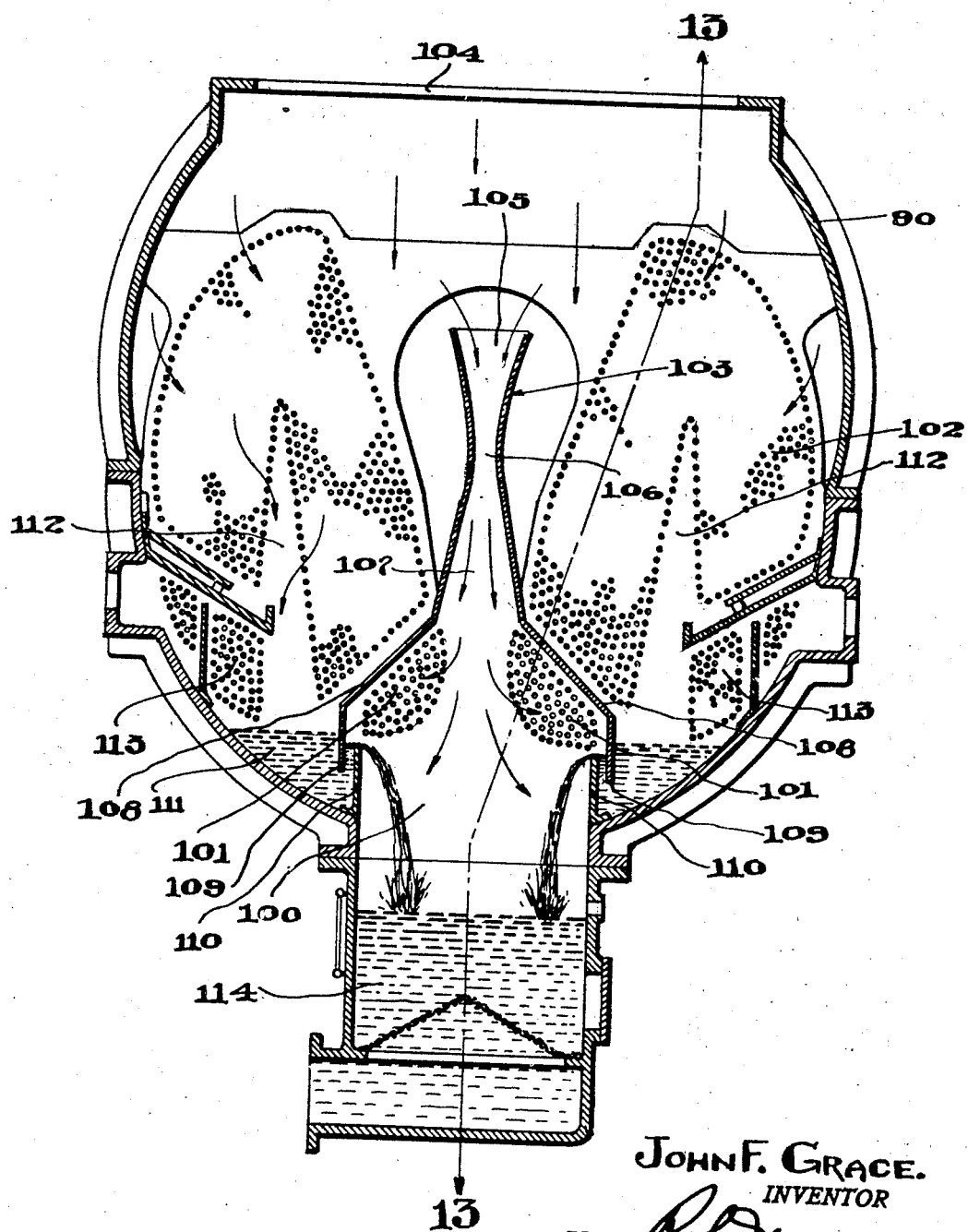

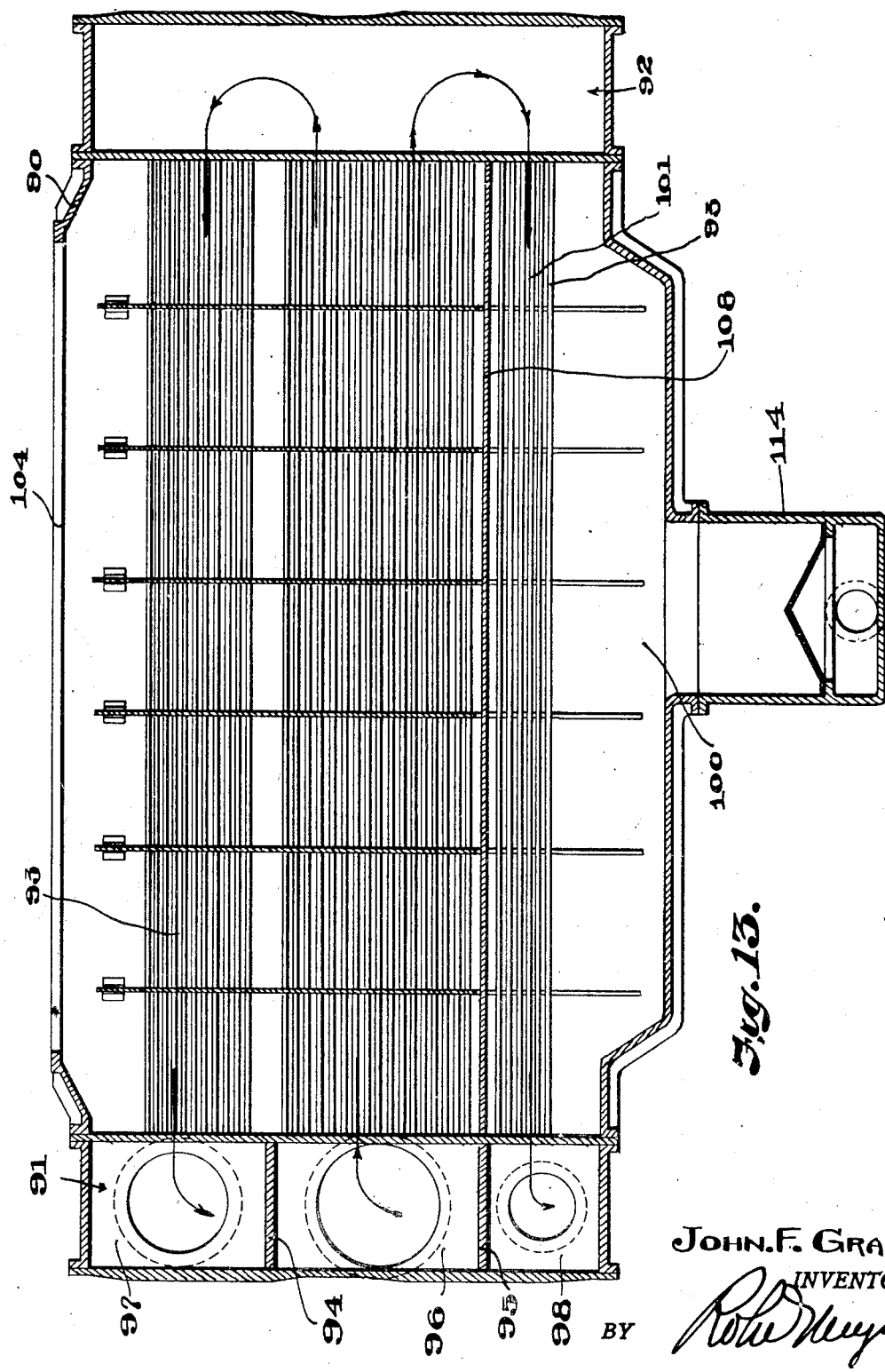

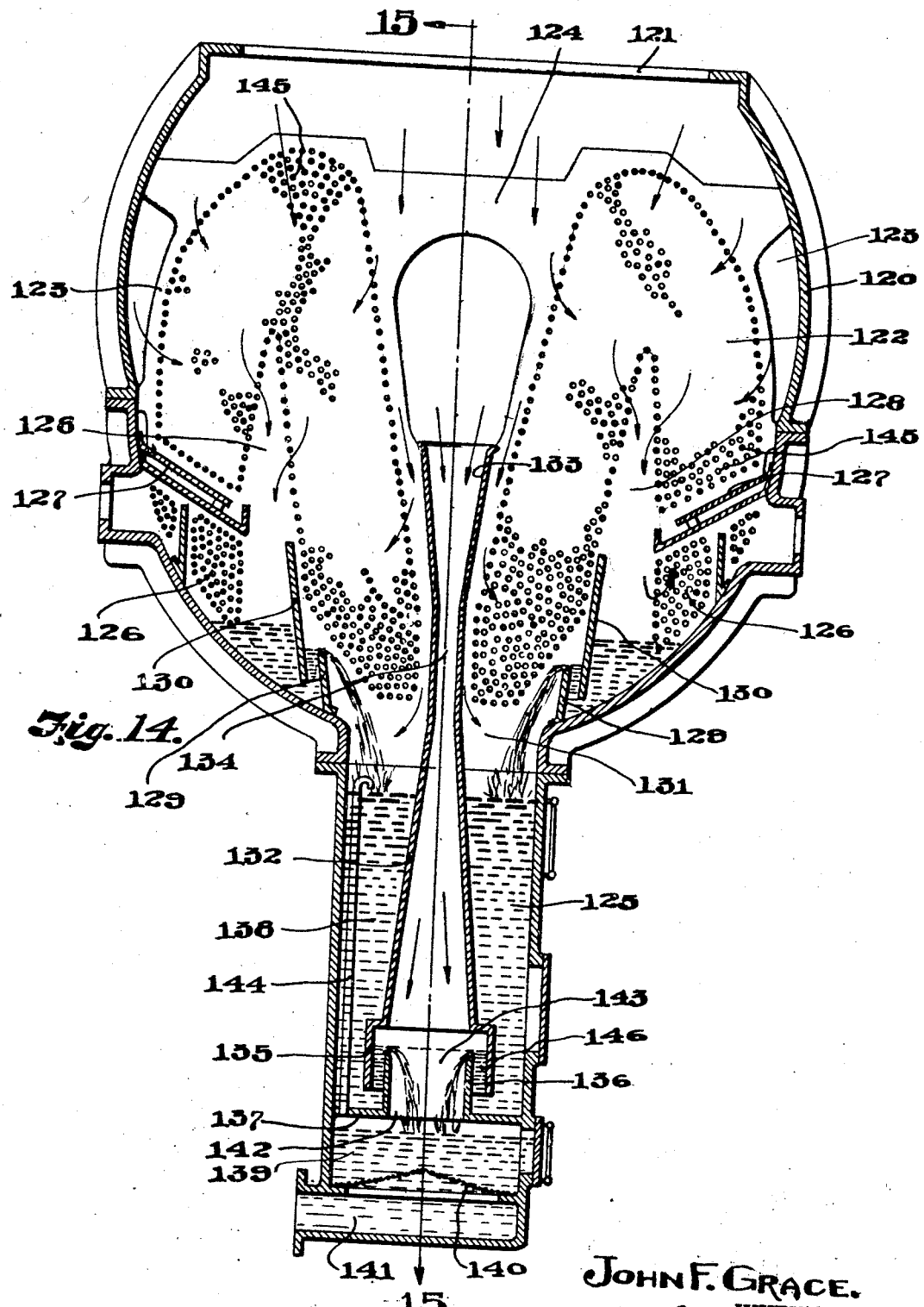

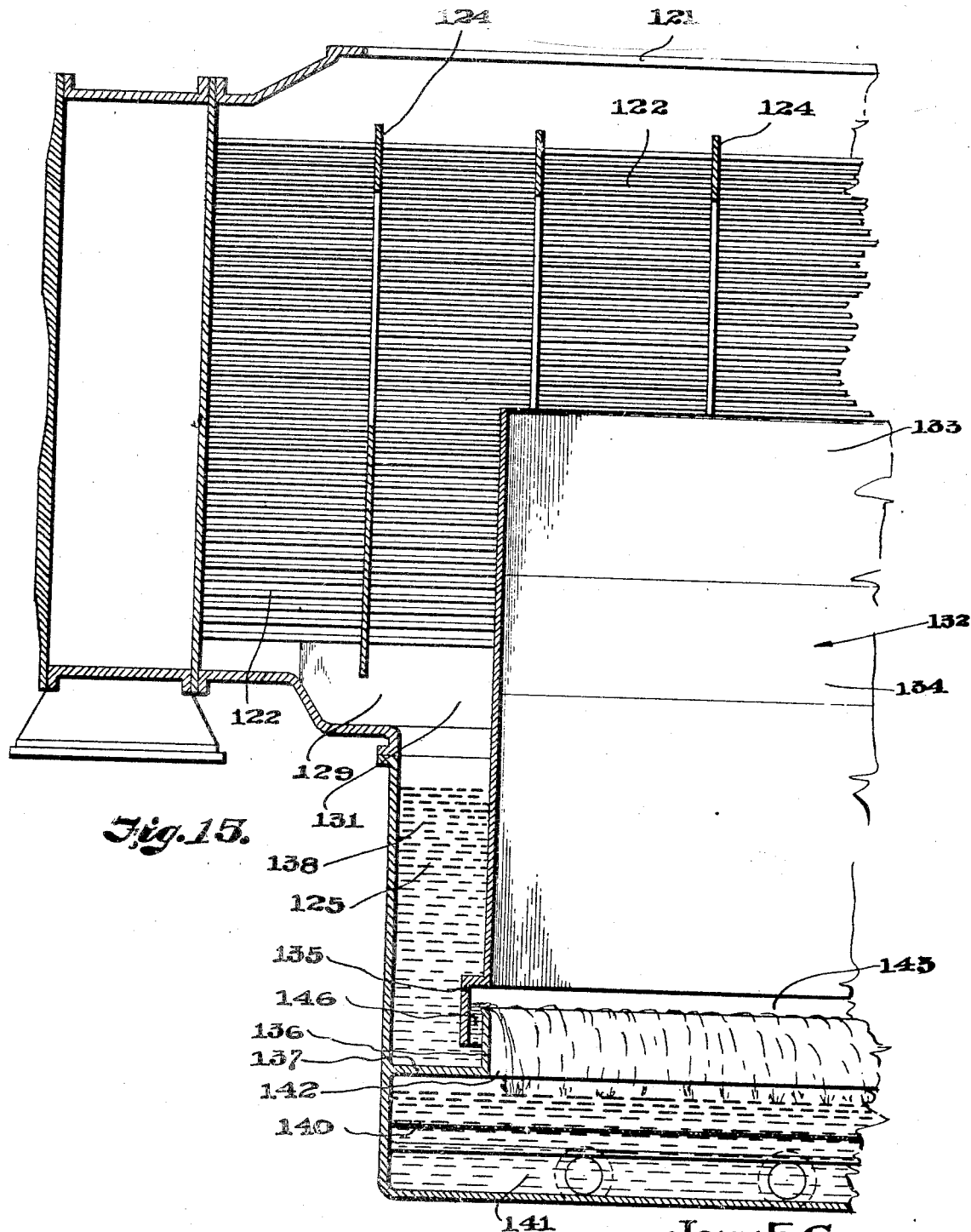

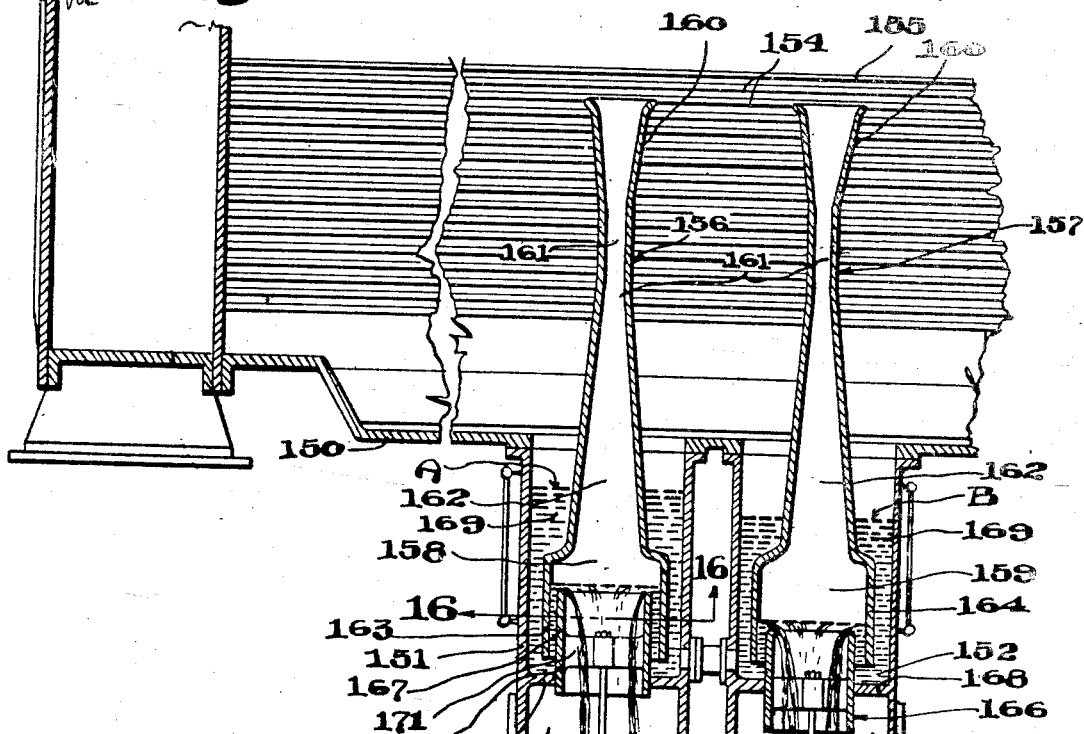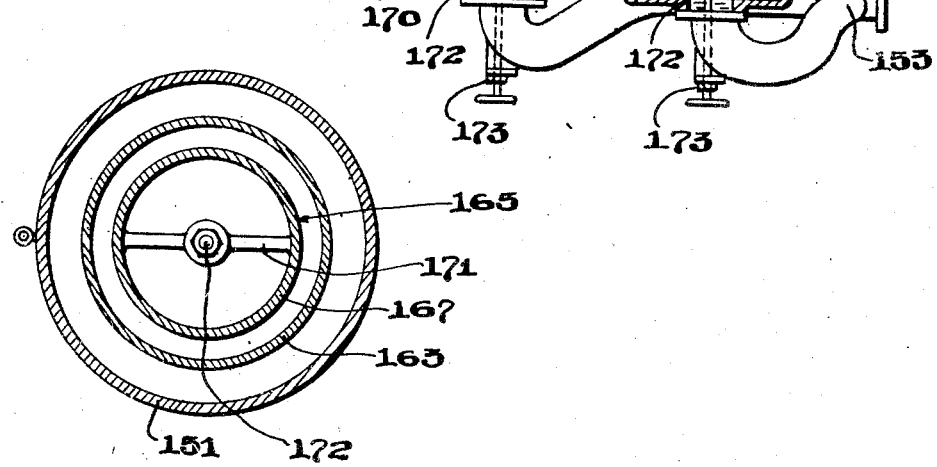

Patented Apr. 26, 1932

1,855,231

UNITED STATES PATENT OFFICE

JOHN F. GRACE, OF ARLINGTON, NEW JERSEY, ASSIGNOR TO WORTHINGTON PUMP AND MACHINERY CORPORATION, OF NEW YORK, N. Y., A CORPORATION OF VIRGINIA

SURFACE CONDENSER

Application filed November 19, 1931. Serial No. 575,986.

This invention relates to surface condensers for condensing steam, and the primary object of the invention is to provide a steam condenser of maximum thermal efficiency, namely, a condenser in which the temperature of the condensate leaving the hotwell is equal to or greater than the temperature of the entering steam.

More specifically, the present invention comprises a steam condenser of the surface type embodying a steam lane leading to the hotwell which lane is so shaped and proportioned that during the passage of steam therefrom the velocity and kinetic energy of the steam will be converted into pressure and temperature or heat for raising the temperature of the condensate entering the hotwell by the transfer of said converted energy, as heat, to the condensate.

With these and other objects in view, as may appear from the accompanying specification, the invention consists of various features of construction and combination of parts, which will be first described in connection with the accompanying drawings, showing surface condensers of preferred forms embodying the invention, and the features forming the invention will be specifically pointed out in the claims.

In the drawings

Fig. 1 is a vertical cross section through a condenser constructed in accordance with the present invention.

Fig. 2 is a longitudinal section through the condenser, the left hand end of the figure being taken on the line 2—2 of Fig. 1 and the right hand end of the view being taken on the line 2—2A of Fig. 1.

Fig. 3 is an enlarged detail section of a part of the improved condenser.

Fig. 4 is a fragmentary detail section of a part of the condenser.

Fig. 5 is a fragmentary detail section of a slightly modified form of the condenser, showing perforated steam guiding plates in the converting lane thereof.

Fig. 6 is a vertical cross section through a modified form of the improved condenser, illustrating an imperforate guide in the converting steam lane.

Fig. 10 is a fragmentary vertical cross section through a further modified form of the condenser showing a part of the tube nest isolated or confined within the pressure or reheating portion of the condenser and having a non-condensible gas outlet for permitting non-condensible gases to pass to the air cooler section of the condenser.

Fig. 11 is a view similar to Fig. 10 only showing adjustable means to permit regulation of the outlet for non-condensible gases from the pressure or reheating portion of the condenser.

Fig. 12 is a vertical cross section through a modified form of the condenser and showing steam guide plates in the converting passage which plates flare to form the pressure or reheating chamber of the condenser and to confine a part of the tube nest in said chamber.

Fig. 13 is a longitudinal section through the modified form of condenser illustrated in Fig. 12.

Fig. 14 is a vertical cross section through a still further modified form of the invention showing the pressure or reheating chamber as located in the hotwell and illustrating suitable guide plates or nozzles in the converting lane.

Fig. 15 is a fragmentary longitudinal section through a condenser of the type shown in Fig. 14 and taken on the line 15—15 of Fig. 14.

Fig. 16 is a fragmentary longitudinal section of a further modification of the type of condenser shown in Fig. 15, and Fig. 17 is a detailed cross section taken on the line 17—17 of Fig. 16.

Figure 7:
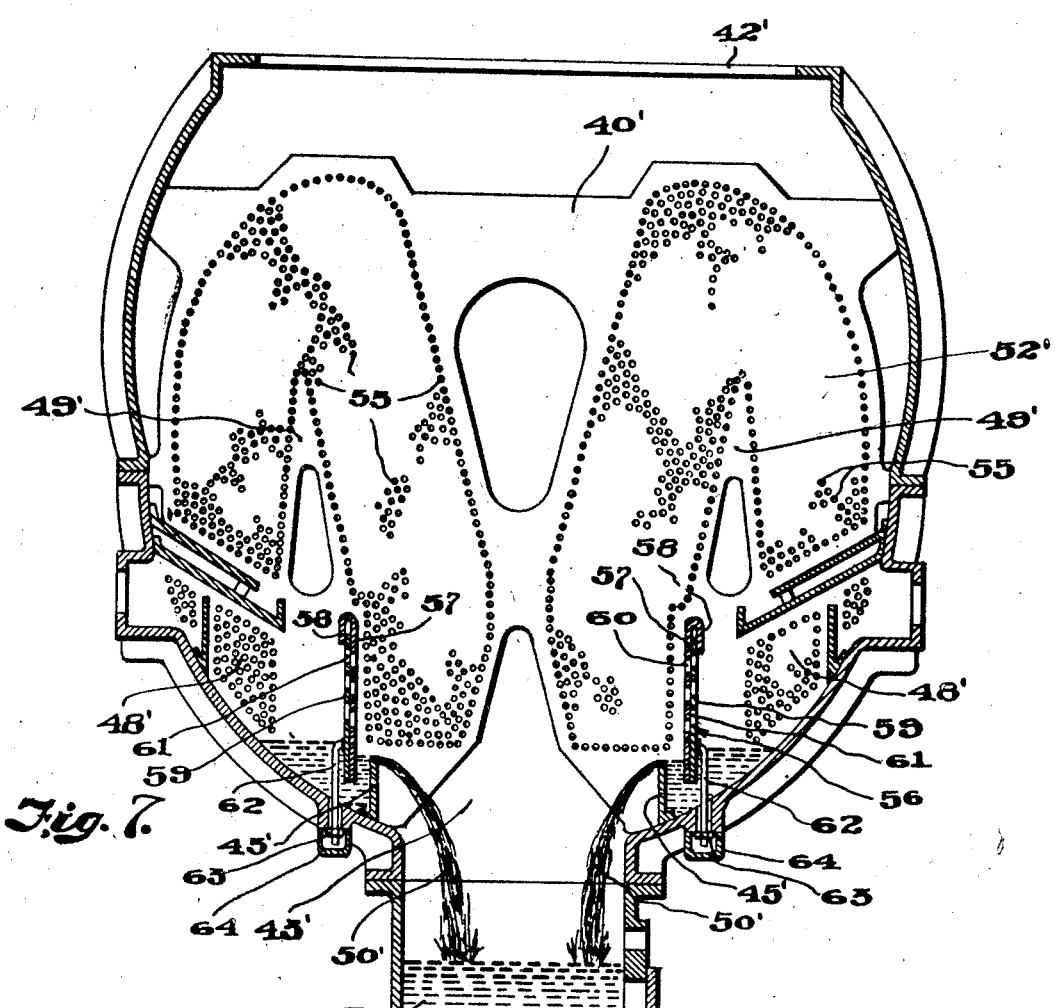
Fig. 7 is a vertical cross section through another modified form of the condenser, showing adjustable means for regulating the size of the communicating space or an area between the tube nest surrounding the diverging portion of the steam lane and the air cooling sections of the condenser.

Referring more particularly to the drawings; in the condenser structure shown in Figs. 1 to 4 inclusive, the shell 1 has an exhaust steam inlet 2 and a hotwell 3 is suitably attached to the shell 1 directly opposite to the exhaust steam inlet 2. The shell 1 has the usual tube sheets 4 therein between which the cooling water circulating tubes 5 extend, the said tubes having communication with the water boxes 6 at the opposite ends of the condenser. The tubes 5 are illustrated as disposed in the folded tube layer design. However, it is to be understood that the tubes may be arranged in any suitable nest formation within the shell, without departing from the spirit of the present invention.

As clearly shown in Fig. 1, the folded tube layer or folded nest of tubes is arranged so as to provide steam inlet lanes 10 and air or non-condensible gas exit lanes 12 isolated from the steam lanes 10 by the adjacent sections of the tube nest. The steam entering the condenser shell through the exhaust steam inlet 2 enters the tube nest as indicated by the various arrows in Fig. 1 where, upon passing through the tube nest, it is condensed by the cooling water circulated through the tubes and the condensate falls to the bottom of the shell. Portions of the interior of the shell and of the tube nest are divided off by combined baffle and drain plates 13 to form the air cooler sections 14 and the condensate which falls from the tubes in the tube nest directly above the combined baffle and drain plates 13 runs down over the surfaces of the uppermost drain plates into longitudinally extending troughs 15 and from the troughs into down spouts or pipes 16. The lower ends of the pipes 16 extend into sockets 17 carried by the condenser shell 1. The sockets 17 are provided with drain or outlet openings 18 which permit the condensate to pass into the lower part of the condenser shell.

The condenser shell is provided with a central longitudinally extending steam lane 19 which converges as it extends downwardly from the exhaust inlet 2 until it reaches the throat 20 and from the throat 20 downwardly the central lane 19 diverges as shown at 21 diverging into the pressure zone or chamber 22. The converging diverging contour of this central steam lane 19 forms a conversion or converting lane so that the velocity and kinetic energy of the steam passing therethrough will be converted into pressure and temperature or heat in the pressure zone 22, resulting in a higher thermal temperature of the steam in the pressure zone 22 than the temperature of the exhaust steam entering the exhaust inlet 2. The heat of the steam in the pressure zone 22 is transferred to the condensate which is showered through the pressure zone on it way to the hotwell, resulting in a hotwell temperature of the condensate equal to or greater than the temperature of the incoming exhaust steam.

The condensate is showered through the pressure zone 22 by means of the baffle plates 23 which cooperate with the baffle plates 24 in forming the pressure zone, a water seal and an obstruction or baffle to prevent steam passing from the pressure zone 22 into the air cooling sections 14 of the condenser or from passing into the air exit lanes 12 of the condenser. The baffle or obstruction plates 24 project upwardly into the tube nest, as clearly shown in Figs. 1 and 2 of the drawings, and they, together with the water seal, maintain an absolute pressure and temperature in the pressure zone 22 in excess of the vacuum and the temperature at the exhaust inlet 2. It will be noted by particular reference to Fig. 1 of the drawings that a relatively deep water seal is formed by the baffles 23 and 24, and the baffles 23 also serve to provide a relatively high cataract of the condensate as it flows over these baffle plates into the hotwell 3, thereby dividing the falling condensate and exposing greater areas of such condensate for direct contact with the steam in the pressure zone 22, resulting in a high heat transfer from the steam to the condensate.

It is a common failing of most surface condensers of approved types that under cooling of condensate is most severe during periods of low cooling water temperature. Depressions of 10° to 15° are known in winter, and sometimes even as much as 20° difference is noted between the condensate temperature and the temperature of the incoming exhaust steam. At such times, or, namely, in winter, when the cooling water is coldest, the vacuum within the condenser is at its best, the absolute pressure of the exhaust steam is lowest and consequently for a given weight of flow the velocity and kinetic energy of the steam are the greatest. In the construction of the condenser forming the present invention this energy, namely, the velocity and kinetic energy, is utilized in the converging diverging steam lane or passage 19 to accumulate pressure and temperature in the pressure zone or pressure chamber 15, which accumulation will be greatest at the time of coldest circulating water and when the condensate heating is most needed, to provide the highest temperature condensate and consequently result in the desired fuel savings. It will be noted, therefore, that at such times a greater pressure and temperature accumulation in the pressure zone 22 will be provided, and consequently a greater heat transfer between the steam in the pressure zone 22 and the condensate resulting in the heating of the condensate to a temperature in excess of the temperature of the incoming exhaust steam.

In other words, it will be noted that the colder the circulating cooling water and consequently the higher the vacuum in the condenser, the greater will be the accumulation of pressure and heat in the pressure zone, and consequently the temperature of the condensate will be proportionally raised, providing proportionally higher temperature condensate at times when with the average approved type of condenser the condensate temperature is lowest. With the condenser of the present invention the temperature of the condensate rises in proportion to the decrease in the temperature of the cooling water and increase of vacuum in the condenser.

In the construction of the condenser shown in Figs. 1 to 4 of the drawings, the baffle plates 24 are supported in any suitable manner from the support plates 25 which support the condenser tubes 5.

The hotwell 3 has a manhole 26 therein normally closed by a closure plate 27 and as shown in Fig. 1 the support plates 25 are cut away at 28. The baffle plates 24 may be provided with manholes 29 therein at any suitable point, preferably at the longitudinal center of the condenser, which manholes are covered by suitable cover plates 30. The manholes 26 and 29 will permit passage into the interior of the condenser and into the air exit lanes 12 of the condenser to allow inspection of the tubes, air coolers and the interior of the condenser in general.

To obtain the highest accumulation of heat in the pressure zone 22 of the condenser, it may be found desirable in practice to line both sides of the converging lane or channel 19 or a part of the length of this lane with perforated plates to produce smoother steam flow and to reduce the loss of the accumulated presser and temperature from eddies which may be set up in the steam flow.

In Fig. 5 of the drawings, such a construction is shown and plates 30 and 31 are provided which extend longitudinally through the condenser and line the throat 20' of the steam lane 19' as well as a portion of the converging part of the lane approaching the throat and a portion of the diverging part 21' of the lane receding from the throat. The plates 30' and 31 are provided with perforations 32 to permit a part of the steam to pass therethrough into the tube nest indicated at 33 on each side of the lane 19'.

In Fig. 6 of the drawings, a modification of the improved condenser is shown in which the converting lane 40 which serves to convert the velocity and kinetic energy of exhaust steam entering the shell 41 through the exhaust inlet 42 into pressure and temperature in the pressure zone 43, has a nozzle 44 positioned therein. The nozzle 44 projects upwardly into the converging portion of the lane 40. The nozzle 44 converges from its mouth for a short distance, and then diverges opening out into the pressure zone 43 which in the present instance is formed by the baffles 45 and the down-turned baffle-forming edges 46 of the lateral extensions 47 of the nozzle 44. The obstruction-forming baffle edges 46 cooperate with the baffles 45 to form a water seal about the pressure chamber 43 and prevent steam from passing from the pressure zone or chamber 43 into the air cooler sections 48 of the condenser and also prevent steam from blowing through the pressure zone 43 into the air or noncondensible gas exit lanes 49, thereby permitting the building up of the pressure and temperature of the steam in the zone 43 for heating the condensate indicated at 50, as it spills over the upper or inner edges of the baffles 45, through the pressure zone 43 into the hotwell 51.

The nozzle 44 is solid or is free from perforations therethrough so that to permit steam to pass into the portions of the tube nest 52 of the condenser at each side of the nozzle 44, the lane 40 bulges or is enlarged about the mouth of the nozzle 44 as shown at 53.

Figure 8:
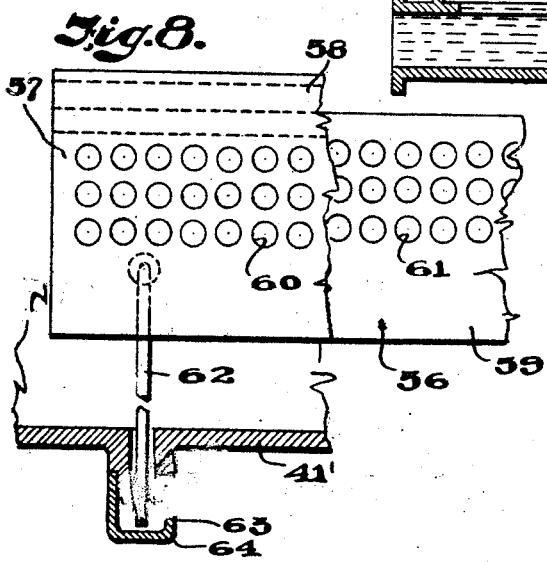
Fig. 8 is an enlarged detail view of the adjustable plate arrangement in the form of condenser illustrated in Fig. 7.
Figure 9:
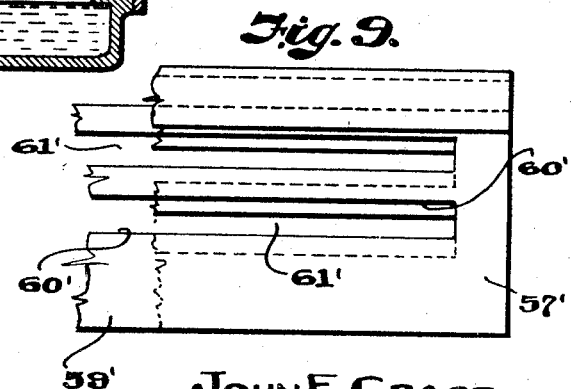
Fig. 9 is a view similar to Fig. 8, only showing slots in the adjustable plate and its cooperating plate in lieu of showing a plurality of openings as shown in Fig. 8.

In the form of condenser shown in Fig. 6 of the drawings, the pressure zone 43 is completely cut off from the air exit lanes 49 and the air cooling sections 48 by the water seal formed by the baffles 45 and the obstruction-forming baffle edges 46 of the nozzle 44 while in the modified form shown in Figs. 7 to 9 inclusive, communication between the pressure zone 43' and the air cooling sections 48' is provided. However, suitable means are provided in this modified form shown in Figs. 7 to 9 inclusive to permit regulation of the communication between the pressure zone 43 and the air cooler sections 48'.

In this last referred to modified form of the condenser construction no nozzles or guide plates are shown along the sides of the conversion lane 40' through which the steam passes from the exhaust steam inlet 42' to the conversion chamber 43'; however, this conversion passage is formed in converging diverging contour by the arrangement of the tubes 55 in the tube nest 52'. The pressure chamber 43' is formed by the baffle plates 45' over which the condensate indicated at 50' spills through the pressure zone 43' into the hotwell 51'. The baffles 45' cooperate with the baffle or obstruction plate structures 56 in forming the pressure zone 43'. The baffle or obstruction-forming structures 56 comprise stationary plates 57, the upper edges of which are folded over as shown at 58 to form guides for the slidable plates 59. The plates 57 and 59 are provided with openings 60 and 61 respectively, which register to provide communication between the portions of the tube nest 52 in close proximity to the pressure zone 43 and the air cooler sections 48' and air exit lanes 49' so as to allow air and other noncondensible gases to pass from these portions of the tube nest into the air cooler sections. The adjustable plates 59 may be adjusted by any suitable means for regulating the sizes of the registering portions of the openings 60 and 61 for the purpose of regulating the outlet area of the communication between the portions of the tube nest in proximity to the pressure zone 43' and the air exit lanes 49'. In Figs. 7 and 8 of the drawings, the plates 59 are shown as having suitable adjusting rods 62 connected thereto which rods project through the condenser shell 41' and have adjusting nuts 63 threaded thereon by means of which the plates 59 may be moved. Suitable housings 64 are provided for the adjusting nuts 63.

In Fig. 9 of the drawings, the plates 57' and 59' which correspond to the plates 57 and 59 are shown as provided with slots 60' and 61' which are adapted to register to form the air and non-condensible gas outlets, in lieu of the openings 60 and 61 as shown in Fig. 8 of the drawings. In all other respects the construction shown in Fig. 9 is the same as that shown in Fig. 8.

The provision of the adjustable plates 57 and 59 or 57' and 59' also permits regulation of the pressure in the pressure zone 43' of the condenser so as to permit control of the pressure or the maintaining of the pressure at the desired degree.

In the form of the condenser shown in Fig. 10 of the drawings, the pressure chamber 70 is formed by the diverging portion 71 of the steam converting lane 72, the baffle plates 73 and the combined baffle and obstruction plate 74.

The upwardly and inwardly inclining section 75 of the combined baffle and obstruction plate 74 divides off a part 76 of the tube nest 77, confining this part 76 of the tube nest within the pressure chamber 70. The plate 74 is provided with a slot or a series of openings 77, which permits escape of non-condensible gases from the section 76 of the tube nest 77 to the air cooling section 78 of the condenser. The baffle 73 and the downwardly and inwardly inclining portion 79 of the plate 74 form a water seal which, together with the downwardly and inwardly inclining portion 79 of the plate 74, provides means for preventing steam which enters the pressure chamber 70 through the lane 72 from blowing into the air cooler sections 78 of the air outlet lanes of the condenser.

Fig. 11 shows a construction of the condenser which is similar to that disclosed in Fig. 10, in that the pressure zone 80 has a part 81 of the tube nest 82 positioned therein and divided off from the remainder of the tube nest by the inwardly and upwardly inclining division and drain plate 83. The plate 83 has its lower edge spaced from the upper edge of the obstruction plate 84, providing a space 85 through which the air and non-condensible gases may pass from the section 81 of the tube nest into the air cooler 86 of the condenser. The size of the opening 85 may be regulated by adjustment of the adjustable plate 87 which slides over the plate 84. The adjustment of the plate 87 for regulating the size of the plate 85 will permit adjustable control of the pressure within the pressure zone 80. The plate 84 cooperates with the baffle plate 88 in forming a water seal to prevent the steam passing from the pressure zone or chamber 80 into the air lane 89 of the condenser, or into the air cooling section 86. Any suitable type of adjusting means as shown at 87' may be provided for adjusting the position of the regulating plate 87.

In this form of condenser as shown in Fig. 11, as well as in that shown in Fig. 10, the converting steam lane is of the converging diverging type for converting velocity and kinetic energy of the steam passing therethrough into pressure and heat in the pressure zone or chamber 70 or 80 of the respective condensers and this heat is transferred to the condensate as it showers through the pressure zone to the hotwell.

It may be found desirable to provide more definite and accurate guiding of the steam through the converting lane and also to provide more definite separation of the pressure zone from the air cooler sections of the condenser, and Figs. 12 and 13 of the drawings illustrate a further modified form of the condenser which will accomplish this result.

In these figures, the condenser comprises the usual shell 90 having the water boxes 91 and 92 positioned at each end thereof and the usual type of cooling water circulating tubes 93 extending from one water box to the other.

As shown in Fig. 13 of the drawings, the particular condenser shown is of the multiple pass type and the water box 91 is provided with partitions 94 and 95 providing a central water inlet portion 96 and spaced water outlet portions 97 and 98 positioned above and below the central water inlet portion 96. In this type of condenser, the cooling water enters the compartment 96 and passes through the tubes 93 which open into this compartment to the water box 92 where the water divides and returns through the condenser shell partly through the tubes which communicate with the upper outlet compartment 97 and partly through the tubes which communicate with the lower outlet compartment 98.

The tubes which communicate with the lower outlet compartment 98 are those confined in the pressure chamber 100 of the condenser and indicated at 101 in Fig. 12 of the drawings, while the remaining tubes of the tube nest 102 are those which communicate with the inlet portion 96 and the outlet portion 97, and thus a part of the returning or second pass of the cooling water will flow through the tubes 93 in the high pressure area of the condenser.

By reference to Fig. 13 of the drawings, it will be noted that the cooling water circulating tubes which extend through the pressure zone 100 of the condenser form one complete pass of the multiple passes of the condenser, and that this is one of the return or final passes of the circulating cooling water. Since the cooling water passing through the tubes which extend through the pressure zone 100 is in its final or outlet pass through the condenser, the temperature of such water will be higher than the temperature of the cooling water flowing through the tubes on its first pass through the condenser. Consequently, there will be a higher temperature zone about the tubes which extend through the pressure zone, resulting in stabilization of the flow of steam through the converging diverging nozzle 103 and also permitting the obtaining of a higher outlet water temperature from the tubes which extend through the pressure zone, and since this water is segregated by the partition 95 from the other outlet of the circulating water of the condenser, it may be used for any desired purpose.

Further, this construction of condenser shown in Figs. 12 and 13 has a nozzle 103 extending longitudinally therein and opening out upwardly towards the steam inlet 104 of the shell 90, so that a part of the steam entering the exhaust inlet 104 will pass into the mouth of the converging portion 105 of the nozzle, pass downwardly through the throat 106 of the nozzle and into the diverging portion 107, leaving the diverging portion and entering into the sections 101 of the tube nest and into the pressure chamber 100. The nozzle 103 has division plates 108 formed thereon which diverge at a greater angle than the sides of the diverging portion 107 of the nozzle and have obstruction plates 109 at their lower outer edges. The obstruction plates 109 project downwardly within the condenser and overlap the upper edges of the baffles 110 so as to cooperate with these baffles in forming a water seal, created by the condensate indicated at 111, to securely seal the pressure chamber 100 from the air exit lanes 112 and the air cooler sections 113 of the condenser, thereby effectively preventing steam from passing out of the pressure zone or chamber 100 into either the air lanes or the air cooling sections of the condenser. The baffles 110, obstruction plates 109 and water seal 111 thoroughly isolate the pressure zone or chamber 100 and permit the building up of pressure and heat therein, so that the maximum of heat may be built up in this zone 100, in proportion to the velocity, quantity and kinetic energy of the exhaust steam entering the condenser shell, and consequently provide maximum heating of the condensate. As is usual in all of the other forms of the condensers hereinbefore described, the condensate spills over the upper edges of the baffles 110 through the pressure zone 100 into the hotwell 114, thereby permitting relatively great surface contact of the steam with the condensate and maximum heat transfer from the steam in the pressure zone to the condensate falling therethrough.

In the various forms of the improved condenser heretofore described and illustrated in Figs. 1 to 14 inclusive, of the drawings, the pressure zone or chamber has been shown and described as located within the shell of the condenser and opening directly into the upper portion of the condenser hotwell, while in the succeeding types of condenser hereinafter described and shown in Figs. 14 to 17 inclusive, a modification of this general feature is shown, wherein the pressure zone or chamber is confined within the hotwell itself with a possible supplementary pressure zone in the condenser shell at the top of the hotwell.

In the construction of condenser shown in Figs. 14 and 15, the shell 120 has the usual exhaust steam inlet 121, a tube nest 122 of any suitable type having steam inlet lanes 123 to permit the entrance of the steam into the tube nest 122. As in the various forms of condenser heretofore described, the central steam inlet lane 124 converges as it extends downwardly from the exhaust steam inlet 121 towards the hotwell 125 and certain sections 126 of the tube nest are isolated or divided off by suitable combined partition and drain plates 127, to provide the air cooler sections 126 of the condenser tube nest. Air or non-condensible gas exit lanes 128 are provided in the tube nest 122 and lead to the air cooler sections 126. Baffle plates 129 are mounted in the condenser shell at its lower end and extend upwardly therein, cooperating with obstruction or baffle plates 130 to form a water seal about the hotwell and about the lower end of the central steam inlet lane 124, so as to provide a pressure zone 131 in which the condensate spilling over the baffles 129 contacts with the steam in this pressure zone 131 for heating the condensate.

As clearly shown in Figs. 14 and 15, the hotwell 125 of this form of condenser has its depth increased over the usual depth of hotwell and a converting nozzle 132 extends downwardly into the hotwell. The converting nozzle 132 has a converging portion 133, the upper open end of which opens into the converging portion of the central steam inlet lane 124. The converging portion 133 of the nozzle converges to the throat 134, the width of which is uniform throughout the length of the relatively short throat. From the throat 134, the nozzle 132 extends into the hotwell 125 and it diverges from the throat downwardly to the water seal forming cowl 135 which is formed upon the lower end of the nozzle 132 at the desired depth in the hotwell 125. The cowl 135 cooperates with an upstanding flange or dam 136 formed on the partition 137. The partition 137 divides the hotwell 125 into the upper condensate accumulating portion 138 and the lower outlet portion 139, from which latter portion the condensate passes through the screen 140 to the outlet 141. The flange 136 surrounds an opening 142 in the partition 137 and it cooperates with the cowl 135 in forming the pressure chamber 143 into which the steam passes from the diverging portion of the nozzle 132 and through which the condensate spills. In spilling through the pressure chamber 143 the condensate cataract is thinned by the flange 136 so as to provide substantially maximum surface contact between the condensate and the steam in the pressure zone or chamber 143. The pressure zone 143 is isolated by the water seal which is formed between the flange 136 and the cowl 135.

An air vent 144 opens out through the partition 137 into the compartment 139 of the hotwell and extends upwardly through the compartment 138 opening out above the condensate level in the compartment 138.

In operation, the steam entering the condenser shell 120 passes downwardly therein in the direction indicated by the various arrows and passes through the tube nest 122 wherein the steam is condensed by the cooling action of the cooling water which is circulated through the tubes 145 of the tube nest. The condensate falls downwardly through the shell, and that which drips upon the drain plate 127 drains downwardly thereover and falls to the bottom of the shell outwardly of the obstruction plates 130 and other condensate from the tubes which are outwardly from the center of the obstruction plates 130 also drips or falls into the condenser shell, and mingling with the condensate drained from the plates 127 accumulates outwardly of the obstruction plates 130 and forms the water seal between these obstruction plates and the baffles 129, so that the space in the shell below the lowermost tubes in the nest and consequently below the lower end of the open portion of the central lane 124, is isolated from the air cooler sections 126, and the air lanes 128, and form a sub or secondary pressure zone in which pressure and temperature are built up due to this isolation of the zone and the converging diverging nature or contour of the central steam lane 124. The condensate showered through the pressure zone 131 over the baffle plates 129 is therefore heated to a relatively high temperature by the steam in the pressure zone 131 and it accumulates in the chamber 138 of the hotwell 125. From the chamber 138 the condensate passes upwardly through the water seal 146 formed by the cowl 135 and the flange 136 and in turn showers through the pressure zone or chamber 143 where it is heated to a higher temperature by contact with the steam which accumulates in this pressure zone 143. The temperature of the steam in the pressure zone 143 will be greater than the temperature of the incoming exhaust steam through the exhaust inlet opening 121 due to the fact that the velocity and kinetic energy of the steam entering the exhaust inlet 121 will be converted into pressure and heat by the converging diverging nozzle 132, and therefore the condensate showering through the pressure zone 143 will be heated to a temperature in excess of that of the incoming steam.

The nozzle 132 may extend substantially the full length of the condenser shell 120, may be located at the point of heaviest steam impact along the condenser length, and used within a single hotwell as shown in Fig. 15 of the drawings, or a plurality of independent nozzles and independent hotwells with adjustable level of overflow dams in the hotwell-contained pressure zone, such as shown in Figs. 16 and 17, may be employed.

In instances where the converting steam nozzles cannot be placed at points of equal and heavy steam impact, the multiple nozzles providing for adjustability of the height of the overflow or water dam in the pressure zones, such as shown in Figs. 16 and 17, may be provided.

In this form of condenser, the condenser shell 150 has two independent hotwells 151 and 152 attached thereto, the outlets of which are connected as shown at 153 in Fig. 16 of the drawings, so as to permit a single outlet for the condensate. The condenser shell 150 has the usual tube nest 154 therein, the tubes 155 of which circulate the water from one water box to the other, and while the drawings do not show the exhaust steam inlet, it is to be understood that such inlet is provided, as is usual in all condenser structures. A vertical cross section through the form of condenser shown in Fig. 16 would be in all respects above the hotwell similar to the vertical cross section shown in Fig. 14 of the drawings, and it is to be understood that the converting nozzles 156 and 157 extend upwardly into a central steam inlet lane corresponding to the steam lane 124, so that a part of the steam passing downwardly through such a central steam lane will pass through the nozzles 156 and 157 into the respective pressure zones or pressure chambers 158 and 159.

The nozzles 156 and 157, like the nozzle 132, have upwardly opening converging portions 160, throats 161 and diverging portions 162 which open into the pressure zones or chambers 158 and 159 respectively. The pressure zones 158 and 159 are formed by the cowls 163 and 164 which are formed on and depend from the lower diverging ends of the nozzles 156 and 157 respectively, and by the adjustable overflow dams 165 and 166 respectively. The adjustable overflow dams 165 and 166 are the same in construction and each comprises a cylindrical housing 167 which slides through the partition 168 in the hotwells. The partitions 168 divide the hotwells into upper compartments 169 and lower outlet compartments 170. Suitable webs 171 are formed within the cylindrical housings 167, and these webs have adjusting rods 172 connected therethrough which project outwardly through the hotwells and cooperate with nuts 173 to permit movement of the housings or dams 167 for regulating the distance between the upper edges of the housings 167 and the lower edges of the cowls 163 or 164 and consequently regulating the depth of the water seal formed by the cowls and the dam housings as well as regulating the size of the pressure zones or chambers 158 or 159, so as to permit uniform pressure and temperature accumulation in these two zones. The providing of uniform pressure and temperature in the zones 158 and 159 provides uniform heating of the condensate which spills over the upper edges of the housings 167 through the respective pressure zones and into the lower outlet portions 170 of the respective hotwells.

An example is; assuming an instance in which an absolute pressure corresponding to one inch of mercury exists within the condenser shell 150 and absolute pressures corresponding to one and one half inches and two inches of mercury exists at the bottom of the two nozzles 156 and 157. The adjustable dam in the hotwell 152 (assuming that the absolute pressure equal to two inches of mercury exists at the lower end of the nozzle 157) which is formed by the housing 167 is lowered so that the condensate level in the hotwell 151 as indicated at A is higher than the condensate level B in the hotwell 152, providing less resistance to the flow of the condensate through the adjustable dam 166 and resulting in a heavier flow of condensate through the pressure zone 159 and in the heating of a greater proportion of the condensate in this pressure zone 159, which has the higher temperature due to the pressure differences between the two pressure zones. This is accounted for because one inch absolute pressure in the condenser corresponds to 79° Fahrenheit, the one and one half inches absolute pressure in the chamber or pressure zone 158 corresponds to 91.5° Fahrenheit therein, while the two inches absolute pressure in the pressure zone 159 corresponds to 100° Fahrenheit of temperature, and by passing the majority of the condensate through this hotter pressure zone, substantially equal heating of the condensate will be provided.

From the foregoing description taken in connection with the accompanying drawings, it will be apparent that a steam condenser of the surface type has been provided, in which the velocity and kinetic energy of a part of the exhaust steam entering the condenser shell will be converted into pressure and temperature or heat in the pressure zone through which the condensate passes, with the result that this added or additional heat will be transferred to the condensate, resulting in a condensate outlet temperature equal to or greater than the temperature of the incoming exhaust steam; and that, while a number of different forms of such a condenser have been hereinbefore described and are illustrated in the drawings, it is to be understood that the invention is applicable also in connection with other forms of condensers and that the invention is not to be limited to the specific construction or arrangement of parts shown, as these may be varied widely within the invention as defined by the claims.

What is claimed is:—

1. In a condenser, a shell having an exhaust steam inlet, a hotwell, and a passage leading from said steam inlet to said hotwell for converting velocity and kinetic energy of steam flowing therethrough into pressure and temperature for heating condensate.

2. In a condenser, a shell having an exhaust steam inlet, a hotwell, means to cause condensate to flow into said hotwell in relatively thin streams, and a converging diverging steam passage from said exhaust steam inlet to said hotwell.

3. In a condenser, a shell having an exhaust steam inlet, a hotwell, a converging diverging passage from said steam inlet to said hotwell, and means for isolating said hotwell from steam flow except through said passage.

4. In a condenser, a shell having an exhaust steam inlet, a tube nest in said shell, a hotwell, a converging diverging steam passage from said steam inlet to said hotwell, and obstruction plates in said tube nest for maintaining pressure in the diverging portion of said passage.

5. In a condenser, a shell having an exhaust steam inlet, a tube nest in said shell, a hotwell, a converging diverging steam passage from said steam inlet to said hotwell, obstruction plates in said tube nest for maintaining pressure in the diverging portion of said passage, and means for directing condensate through the diverging portion of said passage for heating the condensate.

6. In a condenser, a shell having an exhaust steam inlet, a hotwell, a nest of tubes in said shell and provided with steam inlet lanes and air outlet lanes, means isolating said hotwell from said air outlet lanes, one of said steam inlet lanes leading to said hotwell and constructed to convert velocity and kinetic energy of steam flowing therethrough into pressure and heat.

7. In a condenser, a shell having an exhaust steam inlet, a hotwell, a nest of tubes in said shell and provided with steam inlet lanes and air outlet lanes, one of said steam inlet lanes leading to said hotwell and constructed to convert velocity and kinetic energy of steam flowing therethrough into pressure and heat, and obstruction plates projecting into said nest of tubes to prevent steam flowing past said hotwell into said air outlet lanes.

8. In a condenser, a shell having an exhaust steam inlet, a hotwell, a passage leading from said steam inlet to said hotwell for converting velocity and kinetic energy of steam flowing therethrough into pressure and temperature for heating condensate, and means for isolating said hotwell from steam flow except through said passage.

9. In a condenser, a shell having an exhaust steam inlet, a hotwell, an air cooler in the shell, a passage leading from said steam inlet to said hotwell for converting velocity and kinetic energy of steam flowing therethrough into pressure and temperature for heating condensate, and means to prevent steam from passing from the lower portion of said passage to said air cooler.

10. In a condenser, a shell having an exhaust steam inlet, a tube nest in said shell, a hotwell, an air cooler section in said tube nest, a converging diverging steam passage from said steam inlet to said hotwell for converting velocity and kinetic energy of steam flowing therethrough into pressure and temperature, and means for preventing steam from flowing from the diverging portion of said passage to said air cooler.

11. In a condenser, a shell having an exhaust steam inlet, a hotwell, a pressure zone in said shell adjacent to said hotwell, a steam passage communicating with said steam inlet and said pressure zone, said passage and zone proportioned so that the velocity and kinetic energy of steam therein will be converted into pressure and temperature, and means for isolating said hotwell from steam except that in said pressure zone.

12. In a condenser, a shell having an exhaust steam inlet, a hotwell, a pressure zone in said shell adjacent to said hotwell, a steam passage communicating with said steam inlet and said pressure zone, said passage and pressure zone proportioned so that the velocity and kinetic energy of steam therein will be converted to pressure and temperature, obstruction plates forming a water seal and isolating said hotwell from steam except that in said pressure zone and for directing condensate through said chamber in relatively thin streams.

13. In a condenser, a shell having an exhaust steam inlet, a tube nest in the shell, an air cooling section in said tube nest, a hotwell, means within the shell for converting velocity and kinetic energy of steam flowing to the hotwell into pressure and heat, and obstruction plates extending a predetermined distance into the tube nest for isolating the hotwell and air cooler section to prevent steam from flowing past the hotwell to said air cooler section, said obstruction plates forming a water seal and directing condensate into the hotwell in relatively thin streams.

14. In a condenser, a shell having an exhaust steam inlet, a tube nest in the shell, an air cooling section in said tube nest, a hotwell, means within the shell for converting velocity and kinetic energy of steam flowing to the hotwell into pressure and heat, and obstruction plates extending a predetermined distance into the tube nest for isolating the hotwell and air cooler section to prevent steam from flowing past the hotwell to said air cooler section.

15. In a condenser, a shell having an exhaust steam inlet, a hotwell, a nest of tubes in said shell and provided with steam inlet lanes and air outlet lanes, one of said steam inlet lanes leading to said hotwell and constructed to convert velocity and kinetic energy of steam flowing therethrough into pressure and heat, obstruction plates projecting into said nest of tubes to prevent steam flowing past said hotwell into said air outlet lanes, certain of said obstruction plates being composed of adjustable sections whereby the scope of the communicating openings between the tube nest inwardly of said obstruction plates and said air cooler sections may be varied.

16. In a condenser, a shell having an exhaust steam inlet, a hotwell, a nest of tubes in said shell and provided with steam inlet lanes and air outlet lanes, one of said steam inlet lanes leading to said hotwell and constructed to convert velocity and kinetic energy of steam flowing therethrough into pressure and heat, obstruction plates projecting into said nest of tubes to prevent steam flowing past said hotwell into said air outlet lanes, said hotwell provided with a manhole opening, one of said obstruction plates provided with a manhole opening whereby access to the interior of the condenser may be had.

17. In a condenser, a shell having an exhaust steam inlet, a hotwell, a nest of tubes in said shell and provided with steam inlet lanes and air outlet lanes, one of said steam inlet lanes leading from said exhaust steam inlet to said hotwell and being converging diverging in shape for converting velocity and kinetic energy of steam into pressure and heat in the diverging portion of the lane, obstruction plates extending longitudinally in said shell between said hotwell and air outlet lanes and extending outwardly into the tube nest for forming a water seal and preventing steam from flowing past the hotwell into the air lanes, said obstruction plates also causing condensate to flow into said hotwell in relatively thin streams.

18. In a condenser, a shell having an exhaust steam inlet, a hotwell, a converging diverging passage from said steam inlet to said hotwell, perforated guiding plates extending along a portion of the sides of said passage, and means for isolating said hotwell from steam flow except through said passage.

19. In a condenser, a shell having an exhaust steam inlet, a tube nest in the shell provided with steam inlet lanes, a hotwell, one of said steam inlet lanes extending from said steam inlet to said hotwell and being converging diverging in shape for converting velocity and kinetic energy of steam into pressure and heat in the diverging portion of the lane, and perforated plates extending along portions of the sides of said passage.

20. In a condenser, a shell having an exhaust steam inlet, a tube nest in the shell provided with steam inlet lanes, a hotwell, one of said steam lanes leading from said steam inlet to said hotwell, and converging diverging guide plates in said passage for converting velocity and kinetic energy of steam into pressure and heat.

21. In a condenser, a shell having an exhaust steam inlet, a hotwell, a tube nest in said shell provided with steam inlet lanes and air outlet lanes, one of said steam inlet lanes leading from said steam inlet to said hotwell and being converging diverging in shape to provide a pressure chamber adjacent said hotwell and to convert velocity and kinetic energy of steam into pressure and heat in said chamber, obstruction plates for maintaining pressure within said chamber, and adjustable means for regulating the pressure in the chamber.

22. In a condenser, a shell having an exhaust steam inlet, a hotwell, a tube nest in said shell provided with steam inlet lanes and air outlet lanes, one of said steam inlet lanes leading from said steam inlet to said hotwell and being converging diverging in shape to provide a pressure chamber adjacent said hotwell and to convert velocity and kinetic energy of steam into pressure and heat in said chamber, and obstruction plates extending longitudinally in said shell along side of said hotwell and diagonal obstruction plates extending longitudinally in the shell and locating a portion of said tube nest within said pressure chamber.

23. In a condenser, a shell having an exhaust steam inlet, a hotwell, a tube nest in said shell provided with steam inlet lanes and air outlet lanes, one of said steam inlet lanes leading from said steam inlet to said hotwell and being converging diverging in shape to provide a pressure chamber adjacent said hotwell and to convert velocity and kinetic energy of steam into pressure and heat in said chamber, converging diverging steam guiding plates arranged in said passage and diverging at the diverging portion of the passage and confining a portion of said tube nest in said passage, condensate obstruction plates in said shell and cooperating with said guide plates to form a water seal and cause the condensate to flow into the hotwell in relatively thin streams.

24. In a condenser, a shell, condensate drain plates in said shell, troughs for receiving condensate from said drain plates and a plurality of condensate outlet pipes communicating with said troughs.

25. In a condenser, a shell having an exhaust steam inlet, a hotwell, a converging diverging nozzle in said shell and extending into said hotwell for delivering steam into the hotwell and converting velocity and kinetic energy of such steam into pressure and heat, means forming a pressure chamber in said hotwell, said nozzle opening into said pressure chamber.

26. In a condenser, a shell having an exhaust steam inlet, a hotwell, a converging diverging nozzle in said shell and projecting into said hotwell and having its lower converging end in the hotwell to provide a pressure chamber, and an adjustable member carried by the hotwell and cooperating with said nozzle to form a waterseal about said pressure chamber, and means for adjusting said adjustable member.

27. In a condenser, a shell having an exhaust steam inlet, a sectional hotwell, a plurality of converging diverging nozzles in said shell and extending one into each of the sections of the hotwell, said nozzles having their diverging ends in the hotwell to provide pressure chambers in the hotwell, adjustable members carried by the hotwell and projecting into the diverging ends of said nozzles, and forming condensate overflow dams, and means for adjusting each of said members independently of the other for regulating the level of the overflow dams and the condensate level in the hotwells.

28. In a condenser, a shell having an exhaust steam inlet, a tube nest in said shell, a hotwell, means within the shell forming a pressure zone adjacent to the hotwell, a steam lane leading to said pressure zone and proportioned to convert velocity and kinetic energy of steam flow therethrough into pressure and heat, a portion of said tube nest being located in said pressure zone, water boxes, and partitions in said water boxes for directing water through the tubes of the tube nest in multiple passes, said partitions arranged whereby the tubes in said pressure zone will provide one pass of said multiple passes.

29. In a condenser of the multiple pass cooling water type, a shell having an exhaust steam inlet, a tube nest in said shell, a hotwell, means within said shell forming a pressure zone adjacent to the hotwell, a steam lane leading to said pressure zone and proportioned to convert velocity and kinetic energy of steam flowing therethrough into pressure and heat, a portion of said tube nest extending through said pressure zone, the cooling water passes of the condenser being arranged whereby the final pass of the cooling water will be through the tubes in the pressure zone.

30. In a condenser, a shell having an exhaust steam inlet, a tube nest in said shell, a hotwell, an air cooler section in said tube nest, a converging diverging steam passage from said steam inlet to said hotwell for converting velocity and kinetic energy of steam flow therethrough into pressure and temperature, means for preventing steam from flowing from the diverging portion of said passage to said air cooler, a converting nozzle extending into said steam passage and being of converging diverging shape with its diverging portion projecting into said hotwell, means in said hotwell cooperating with said nozzle to form a pressure zone in the hotwell, said means directing the condensate through said hotwell-contained pressure zone.

31. In a condenser, a shell having an exhaust steam inlet, a hotwell, a pressure zone in said shell adjacent to said hotwell, a steam passage communicating with said steam inlet and said pressure zone, said passage and pressure zone proportioned so that the velocity and kinetic energy of steam therein will be converted to pressure and temperature, and means for isolating said hotwell from steam except that in said zone, said means acting to direct condensate through said chamber to said hotwell.

32. In a condenser, a shell having an exhaust steam inlet, a tube nest in the shell, an air cooling section in said tube nest, a hotwell. means within the shell for converting velocity and kinetic energy of steam flowing to the hotwell into pressure and heat, and obstruction plates extending a predetermined distance into the tube nest for isolating the hotwell and air cooler section to prevent steam from flowing past the hotwell to said air cooler section, certain of said obstruction plates being composed of adjustable sections whereby the scope of the communicating space between the tube nest inwardly of said obstruction plates and said air cooler section may be varied.

33. In a condenser, a shell having an exhaust steam inlet, a hotwell, a nest of tubes in said shell and provided with steam inlet lanes and air outlet lanes, one of said steam inlet lanes leading to said hotwell and constructed to convert velocity and kinetic energy of steam flowing therethrough into pressure and heat, obstruction plates projecting into said nest of tubes to prevent steam flowing past said hotwell into said air outlet lanes, certain of said obstruction plates being composed of adjustable sections whereby the scope of the communicating openings between the tube nest inwardly of said obstruction plates and said air cooler sections may be varied, and means exterior of said condenser shell for adjusting said plates.

34. In a condenser, a shell having an exhaust steam inlet, a tube nest in the shell provided with steam inlet lanes, a hotwell, one of said steam lanes leading from said steam inlet to said hotwell, converging diverging guide plates in said passage for converting velocity and kinetic energy of steam into pressure and heat, obstruction plates extending in said shell, and lateral extensions on the ends of the diverging portions of said guide plates and extending to said obstruction plates for isolating the hotwell from steam except that in said passage.

35. In a condenser, a shell having an exhaust steam inlet, a tube nest in the shell provided with steam inlet lanes, a hotwell, one of said steam lanes leading from said steam inlet to said hotwell, converging diverging guide plates in said passage for converting velocity and kinetic energy of steam into pressure and heat, obstruction plates extending in said shell, and lateral extensions on the ends of the diverging portions of said guide plates and extending to said obstruction plates for isolating the hotwell from steam except that in said passage, said obstruction plates arranged to form a water seal and cause the condensate to flow in relatively thin streams into said hotwell.

36. In a condenser, a shell having an exhaust steam inlet, a hotwell, a tube nest in said shell provided with steam inlet lanes and air outlet lanes, one of said steam inlet lanes leading from said steam inlet to said hotwell and being converging diverging in shape to provide a pressure chamber adjacent said hotwell and to convert velocity and kinetic energy of steam into pressure and heat in said chamber, obstruction plates for maintaining pressure in said chamber and providing air outlet openings to the air outlet lanes, and adjustable plates for regulating the size of said air outlet openings and regulating the pressure within said chamber.

37. In a condenser, a shell having an exhaust steam inlet, a hotwell, a tube nest in said shell provided with steam inlet lanes and air outlet lanes, one of said steam inlet lanes leading from said steam inlet to said hotwell and being converging diverging in shape to provide a pressure chamber adjacent said hotwell and to convert velocity and kinetic energy of steam into pressure and heat in said chamber, converging diverging steam guiding plates arranged in said passage and diverging at the diverging portion of the passage and confining a portion of said tube nest in said passage.

38. In a condenser, a shell, a tube nest in said shell, condensate drain plates isolating a portion of said tube nest to form air cooler sections, troughs extending along the lower edges of said condensate drain plates and a plurality of condensate outlet pipes communicating with said troughs.

39. In a condenser, a shell having an exhaust steam inlet, a hotwell, a converging diverging nozzle in said shell and extending into said hotwell for delivering steam into the hotwell and converting velocity and kinetic energy of such steam into pressure and heat, a plurality of plates forming a pressure chamber in said hotwell, said nozzle opening into said pressure chamber, said plates forming a water seal and causing the condensate to flow through said pressure chamber in relatively thin streams.

40. In a condenser of the multiple pass cooling water type, a shell having an exhaust steam inlet, a hotwell, a tube nest in said shell provided with steam inlet lanes and air outlet lanes, one of said steam inlet lanes leading from said steam inlet to said hotwell and being converging diverging in shape to provide a pressure chamber adjacent to said hotwell and to convert velocity and kinetic energy of steam into pressure and heat in said chamber, converging diverging steam guiding plates arranged in said passage and diverging at the diverging portion of the passage and confining a portion of said tube nest in said passage, the cooling water passes of the condenser arranged whereby the final pass of the cooling water will be through the tubes in the pressure zone.

41. In a condenser a shell having an exhaust steam inlet, a tube nest in said shell, a hotwell, an air cooler section in said tube nest, a converging diverging steam passage from said steam inlet to said hotwell for converting velocity and kinetic energy of steam flowing therethrough into pressure and temperature, means for preventing steam from flowing from the diverging portion of said passage to said air cooler, a nozzle of converging diverging shape having its converging portion opening out into said steam passage and its diverging portion opening out into said hotwell, a condensate dam cooperating with the diverging end of said nozzle to provide a water seal and form a pressure chamber in the hotwell, said dam serving to direct the condensate through the hotwell-contained pressure chamber in relatively thin streams.

42. In a condenser a shell having an exhaust steam inlet, a tube nest in said shell, a hotwell, an air cooler section in said tube nest, a converging diverging steam passage from said steam inlet to said hotwell for converting velocity and kinetic energy of steam flowing therethrough into pressure and temperature, means for preventing steam from flowing from the diverging portion of said passage to said air cooler, a nozzle of converging diverging shape having its converging portion opening out into said steam passage and its diverging portion opening out into said hotwell, a condensate dam cooperating with the diverging end of said nozzle to provide a water seal and form a pressure chamber in the hotwell, and means for adjusting the elevation of said dam for regulating the depth of the water seal.

43. In a condenser, a shell having an exhaust steam inlet, a tube nest in said shell, a plurality of hotwells, an air cooler section in said tube nest, a converging diverging steam passage from said steam inlet to said hotwells for converting velocity and kinetic energy of steam flowing therethrough into pressure and heat, means for preventing steam from flowing from said diverging portion to said air cooler, a plurality of nozzles of converging diverging shape extending into said steam passage and projecting one into each of said hotwells, condensate dam-forming members carried by said hotwells and cooperating with said nozzles to form condensate seals and pressure chambers within the hotwells, and means for adjusting the positions of said condensate dam-forming members for regulating the depths of the water seals.

44. In a condenser, a shell having an exhaust steam inlet, a tube nest in said shell, a plurality of hotwells, a plurality of nozzles having their upper ends converging and opening out into the condenser shell the lower ends of said nozzles being diverging and opening out into the hotwells, and adjustable means cooperating with the diverging ends of said nozzles for forming pressure zones at the diverging ends of the nozzles and water seals about said zones, said means being adjustable to regulate the flow of condensate through the pressure zones.

45. In a condenser, a shell having an exhaust steam inlet, a hotwell, a pressure zone in said shell adjacent to said hotwell, a steam passage in said shell communicating with said steam inlet and said pressure zone, said passage and zone proportioned so that the velocity and kinetic energy of steam therein will be converted into pressure and temperature.

In testimony whereof I affix my signature.

JOHN F. GRACE.